(12) United States Patent
Kim et al.

(10) Patent No.: US 12,259,770 B2
(45) Date of Patent: Mar. 25, 2025

(54) SELECTIVELY THROTTLING SUBSYSTEMS OF BATTERY-POWERED COMPUTING DEVICES

(71) Applicant: Microsoft Technology Licensing, LLC, Redmond, WA (US)

(72) Inventors: Donghwi Kim, Kirkland, WA (US); Gregory Allen Nielsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 18/173,536

(22) Filed: Feb. 23, 2023

(65) Prior Publication Data
US 2024/0192754 A1 Jun. 13, 2024

Related U.S. Application Data (60) Provisional application No. 63/386,403, filed on Dec. 7, 2022.

(51) Int. Cl.
| | | |
|---|---|---|
| G06F 1/00 | (2006.01) | |
| G06F 1/3206 | (2019.01) | |
| G06F 1/324 | (2019.01) | |
| G06F 1/3296 | (2019.01) | |

(52) U.S. Cl.
CPC .......... *G06F 1/3206* (2013.01); *G06F 1/324* (2013.01); *G06F 1/3296* (2013.01)

(58) Field of Classification Search
CPC ....... G06F 1/3206; G06F 1/324; G06F 1/3296
See application file for complete search history.

(56) References Cited

U.S. PATENT DOCUMENTS

| | | | |
|---|---|---|---|
| 10,871,818 B1 | 12/2020 | De La Cropte De Chanterac et al. | |
| 10,884,475 B1 | 1/2021 | Wang et al. | |
| 2007/0050650 A1* | 3/2007 | Conroy .................. | G06F 1/26 713/300 |
| 2009/0152942 A1* | 6/2009 | Waite .................... | H02J 1/14 307/9.1 |
| 2016/0054776 A1* | 2/2016 | Lu ........................ | G06F 1/10 713/322 |
| 2016/0066266 A1 | 3/2016 | Law et al. | |
| 2017/0075397 A1* | 3/2017 | Saeidi .................. | G06F 1/324 |

(Continued)

OTHER PUBLICATIONS

International Search Report and Written Opinion received for PCT Application No. PCT/US23/035565, Feb. 9, 2024, 12 pages.

*Primary Examiner* — Nitin C Patel
(74) *Attorney, Agent, or Firm* — Alleman Hall & Tuttle LLP (57) ABSTRACT

A method is presented for selectively throttling subsystems of a battery-powered computing device. The method comprises determining an amount of power consumed a plurality of rest-of-platform (ROP) subsystems of the battery-powered computing device. A total amount of power consumed by subsystems of a battery-powered computing device is determined. The subsystems including at least a system on a chip (SOC) and the plurality of ROP subsystems. Responsive to recognizing a condition where the amount of power consumed by the plurality of ROP subsystems is above an ROP power threshold, and where the total amount of power consumed increases above a first throttling threshold, one or more ROP subsystems are throttled.

17 Claims, 9 Drawing Sheets

(56) References Cited

U.S. PATENT DOCUMENTS

| | | |
|---|---|---|
| 2019/0326776 A1 | 10/2019 | De La Cropte De Chanterac et al. |
| 2019/0335353 A1 | 10/2019 | Kocagoez |
| 2021/0208663 A1 | 7/2021 | Cooper |
| 2022/0043504 A1 | 2/2022 | Ananthakrishnan et al. |
| 2022/0365586 A1 | 11/2022 | Kim et al. |

* cited by examiner

SELECTIVELY THROTTLING SUBSYSTEMS OF BATTERY-POWERED COMPUTING DEVICES

CROSS REFERENCE TO RELATED APPLICATIONS

This application claims priority to U.S. Provisional Patent Application Ser. No. 63/386,403, filed Dec. 7, 2022, the entirety of which is hereby incorporated herein by reference for all purposes.

BACKGROUND

Mobile computing devices employ batteries to provide power to numerous systems and subsystems when not tethered to a power source. Such power may be provided directly or indirectly, such as via a buck-boost converter. While the various processors of the mobile computing device generally consume the bulk of available power, audio amplifiers, wireless communication amplifiers, haptic motors, etc. may also consume significant amounts of power. Excessive consumption of battery power may lead to brown-outs, degrading performance of the device processors and frustrating the device user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method is presented for selectively throttling subsystems of a battery-powered computing device. The method comprises determining an amount of power consumed a plurality of rest-of-platform (ROP) subsystems of the battery-powered computing device. A total amount of power consumed by subsystems of a battery-powered computing device is determined. The subsystems including at least a system on a chip (SOC) and the plurality of ROP subsystems. Responsive to recognizing a condition where the amount of power consumed by the plurality of ROP subsystems is above an ROP power threshold, and where the total amount of power consumed increases above a first throttling threshold, one or more ROP subsystems are throttled.

DETAILED DESCRIPTION

Computer chips and processors are distributed from a manufacturer with an indicated thermal design power rating (e.g., 30 Watts). This rating generally refers to an amount of cooling the manufacturer expects the processor to be able to handle while sustaining performance without overheating for an extended duration. Many such processors feature boost technology that allow the processor to burst to a much higher level of power (e.g., 60 Watts) for a brief duration, before returning to the lower level of power for sustained periods. On top of that, burst level power spikes (e.g., 120 Watts) may occur for millisecond durations, causing the battery voltage to droop. If the battery voltage droops far enough, the system voltage will not be high enough to sustain power needs for the mobile computing device, causing brownouts. Reducing or preventing such power spikes may prevent the mobile computing device from shutting down.

As such, mobile computing devices may employ brown-out protection mechanisms to avoid excessive battery voltage droops where the system voltage falls below the minimum required levels for processor operation while under dynamic system loads. Typically, such brown-outs are mitigated through aggressively throttling core clock frequencies and/or voltages of the processors of the computing device system-on-a-chip (SOC) at the time of load surge. While this method is generally effective at keeping battery voltage in check, it may negatively affect system performance, and thus may noticeably impact the user experience. For example, impacts of throttling the SOC can include lags or degradation in performance, such as reduced framerates, loading latencies, etc. This degradation may still be noticeable when the load surge ends, even if the power usage of the SOC has returned to an acceptable range.

Figure 1:
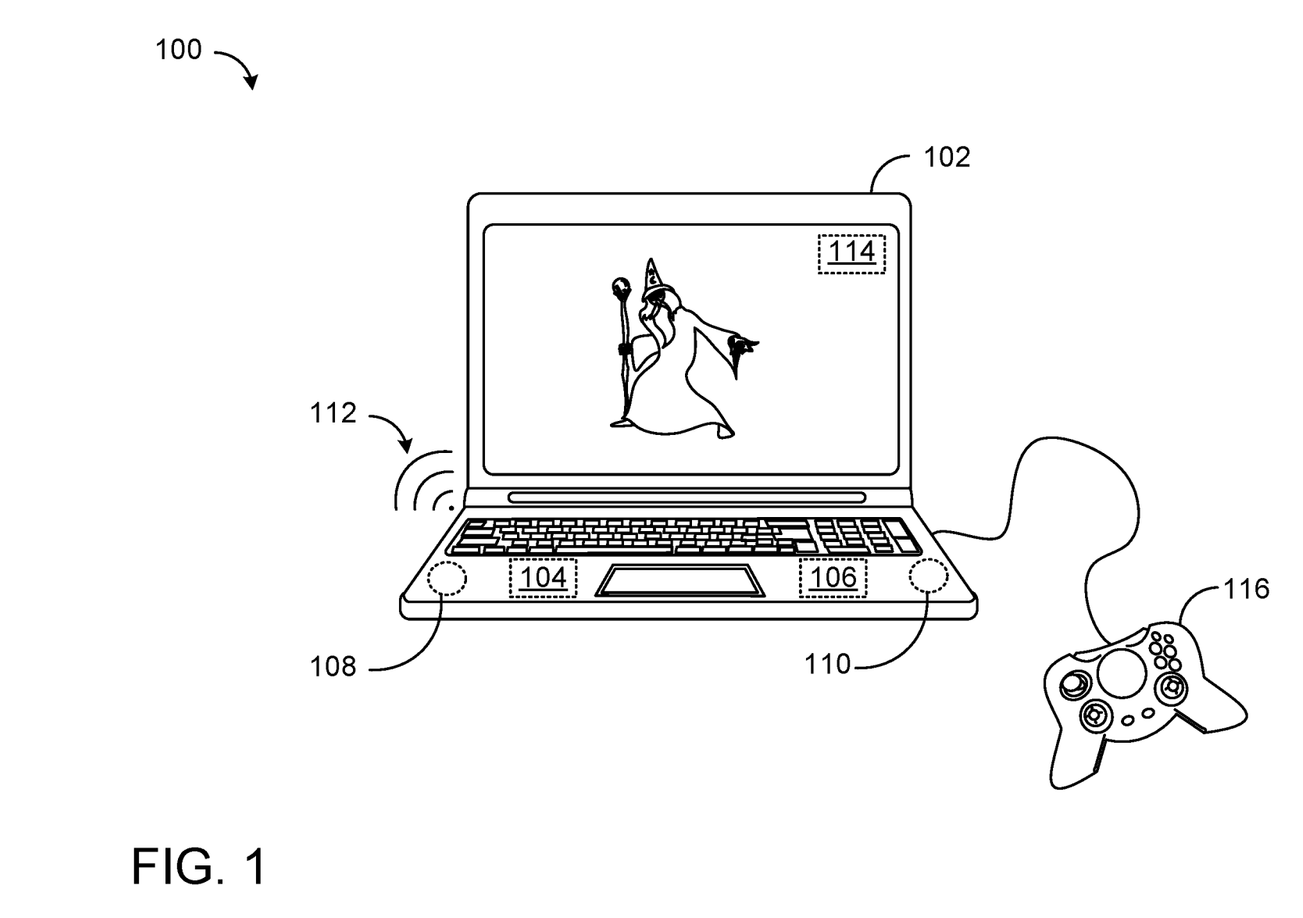
FIG. 1 shows an example mobile computing environment.

FIG. 1 shows an example mobile computing environment 100. For mobile computing devices, such as laptop computing device 102, that are used for multi-media scenarios, central processing unit (CPU) 104 and graphics processing unit (GPU) 106 may generally be the largest consumers of battery power. However, other sub-system domains, collectively referred to as rest-of-platform (ROP) domains (e.g., audio amplifiers 108, 110, wireless communication amplifiers 112, display driver 114) may also consume significant amounts of power. External devices such as gaming controller 116, mobile phones, and peripheral component interconnect (PCI) devices that are tethered to the mobile computing device for charging may draw power from the battery without being subject to the main control patterns that govern power management of on-board subsystems. In some scenarios, these other devices and subsystems may be targets for throttling when load surge is detected or even merely anticipated. In this way, the SOC performance may be maintained in the face of approaching brown-out conditions.

Herein, example methods are provided for dynamically selecting and/or pre-emptively configuring one or more subsystems and/or power suppression targets before a low battery voltage brown-out threshold occurs. For example, when ROP subsystem power usage is above a threshold, those devices and subsystems may be throttled first, prior to throttling the processor cores. Multiple layers of brown-out prevention limiting may be asynchronously applied to different domains and subsystems of the mobile computing device. Further, the throttling logic may include scenario detection, multiple domain average power monitoring, battery capability metrics (charge levels, run-time peak load capabilities), power supply unit (PSU) detection, etc.

Brown-out protection methods may thus be extended to include the throttling of ROP power. ROP power may be monitored and flagged when it increases above a threshold level. Concurrently, battery run-time capabilities, PSU presence, and other ROP device settings (e.g., audio volume, wireless network settings) are monitored. Based on this information, one or more throttling targets may be selected and targeted for voltage reduction and/or clocking frequency reduction, in the case of processors. Throttling targets may be prioritized to both prevent brown-outs and to minimize the impact on overall system performance. ROP power throttling may be prioritized in many scenarios to minimize or prevent the impact of SOC power throttling.

In some examples, this may include reactively or preemptively limiting a maximum SOC frequency. For ROP devices such as audio amplifiers, speaker amplifier gain/loudness may be reactively suppressed momentarily (e.g., on the order of milliseconds) to suppress power spikes. For haptic motors, haptic acceleration gain may be reactively or preemptively adjusted. For wireless communications amplifiers (e.g., 5G amplifiers) gain adjustment may include adjusting data rates, range coverages, etc.

Figure 2:
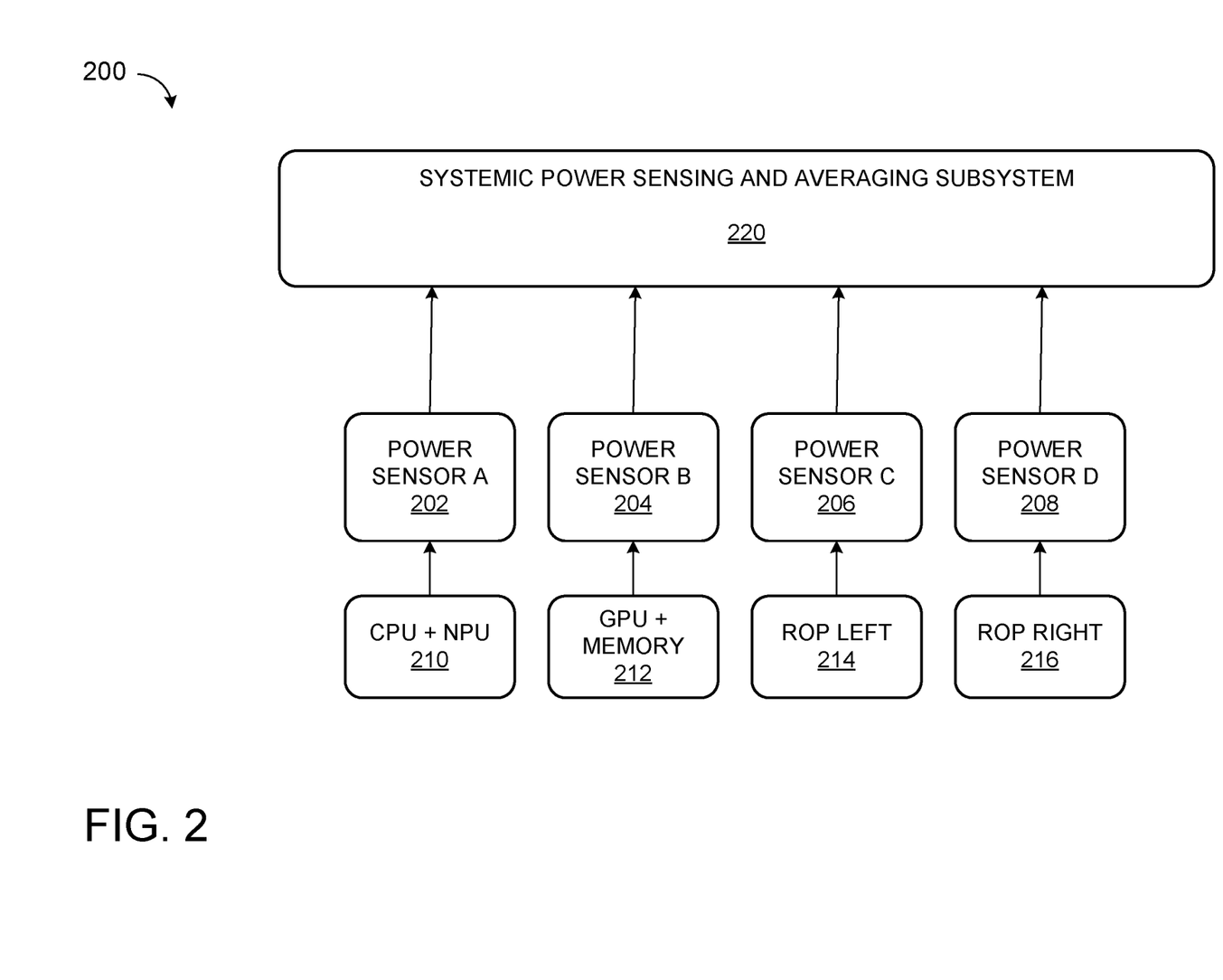
FIG. 2 schematically shows a system power sensing hierarchy for a mobile computing device.

FIG. 2 schematically shows a system power sensing hierarchy 200 for prioritizing brown-out control in a mobile computing device. In this example, four power sensors are provided: power sensor A 202, power sensor B 204, power sensor C 206, and power sensor D 208. However more or fewer power sensors may be included in other examples. Power sensors A-D may comprise power meters and/or sense resistors that collectively read out the power, voltage, and current for a branch. As a non-limiting example, each power sensor may comprise four sense resistors and four power meters.

In this example, power sensor A 202 and power sensor B 204 report power levels for the SOC. Power sensor A 202 reports power levels for the CPU and the NPU (210), while power sensor B 204 reports power levels for the GPU and for the system memory (212). Power sensor C 206 reports power for left side ROM subsystems (ROP left 214), and power sensor D 208 reports power for right side ROP subsystems (ROP right 216). Each of power sensor A 202, power sensor B 204, power sensor C 206, and power sensor D 208, report their respective readings to systemic power sensing and averaging subsystem 220. Systemic power sensing and averaging subsystem 220 may process inputs from the power sensors, and may perform smoothing, sampling, averaging over one or more time constants, etc. in order to generate a complete and accurate picture of current, recent, and upcoming power use by the processors and subsystems.

Generally, some of the ROP components are on the left side, and some on the right side in the printer circuit board area. A single sense resistor and power meter for all ROP components could be used, but having separate sense resistors and power meters can be preferable due to layout constraints while providing an additional layer of accuracy. As an example, ROP left 214 may comprise a left fan, left speaker amplifier, left tweeter, left 5G antenna module, a display (backlight) driver, etc. ROP right 216 may comprise a right fan, right speaker amplifier, right tweeter, right 5G antenna module for 5G, 4G/5G modem, etc.

In general, ROP left 214 and ROP right 216 are directly powered by the battery. For power throttling, these may represent the most effective way to negate impact on battery voltage. Devices such as the speaker, the tweeters, haptic motors, wireless communication amplifiers are generally directly connected to the battery, and can be regulated as such. In some examples, a device or subsystem may be indirectly connected to the battery, e.g., via a Class D architecture, a boost converter, or buck-boost converter. In those scenarios, the indirectly connected device or subsystem may instead by subjected to gain controls. The gain for a subsystem may be severed if the device reaches a threshold power consumption, for example.

Figure 3:
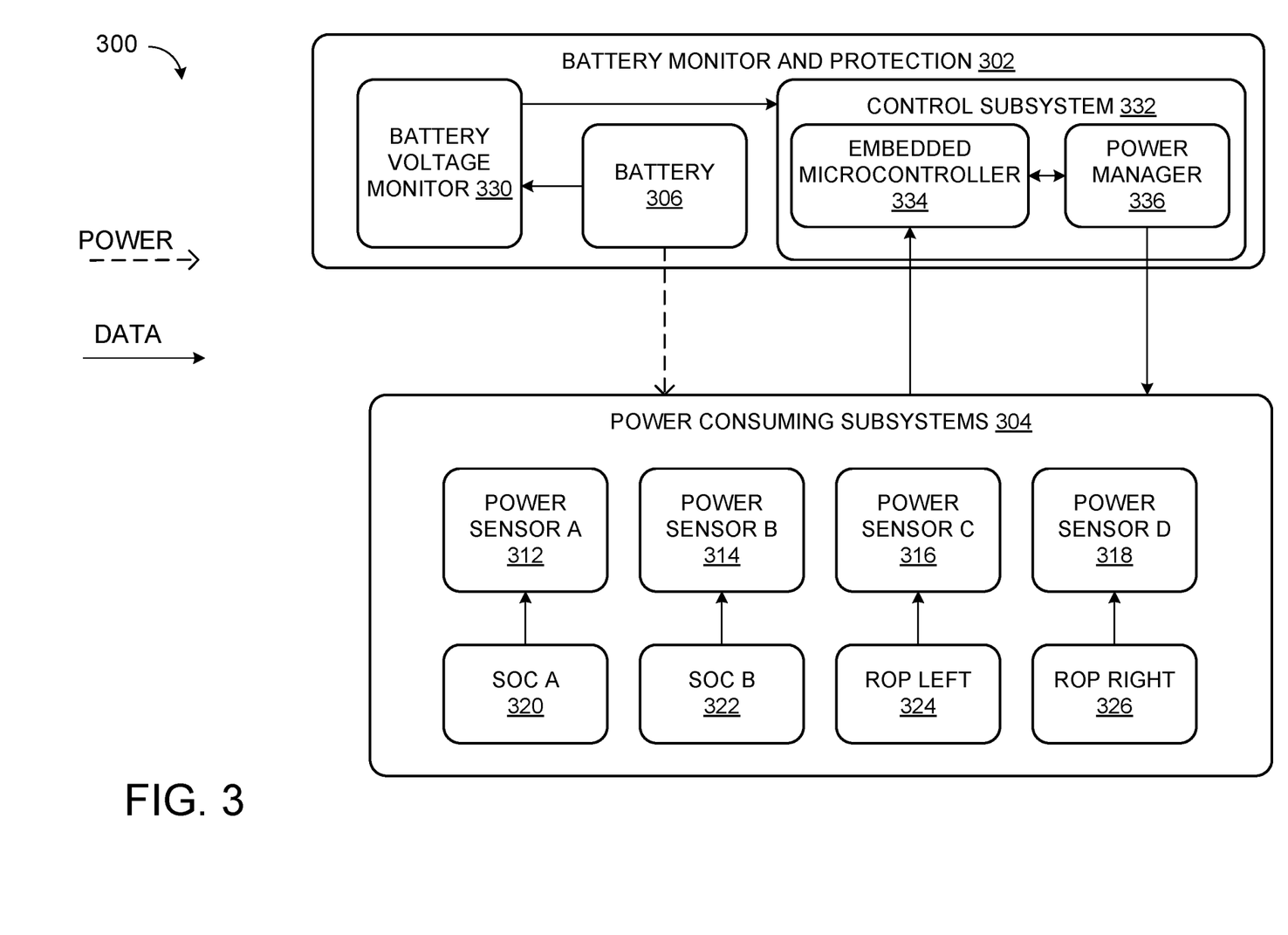
FIG. 3 schematically shows a systemic architecture for prioritized brownout protection for a mobile computing device.

Analyzing power consumption across processors and subsystems with battery charge and voltage monitoring may provide a fully integrated picture of battery health, while aiding in decision making about where power consumption may be most effectively throttled without deteriorating user experience. FIG. 3 shows an example system architecture 300 for prioritized brownout protection. System architecture 300 includes a battery monitor and protection subsystem 302 as well as power consuming subsystems 304, each of which operate based on power distributed from battery 306.

Similarly to FIG. 2, power consuming subsystems 304 includes four power sensors: power sensor A 312, power sensor B 314, power sensor C 316, and power sensor D 318. Power sensor A 312 and power sensor B 314 report power levels for SOC A 320 and SOC B 322, respectively. SOC A 320 and SOC B 322 include at least the CPU, GPU, NPU, and system memory. Power sensor C 316 and power sensor D 318 report power levels for ROP left 324 (including at least left audio amplifiers) and ROP right 326 (including at least right audio amplifiers), respectively.

Battery 306 reports battery voltage to battery voltage monitor 330. Battery voltage monitor 330 may sample battery voltages periodically and/or integrate battery voltages over time and output those voltages to control subsystem 332. Battery voltage monitor 330 may maintain a plurality of thresholds via one or more comparators, and may flag moments when those thresholds are crossed e.g., when battery voltage droops below a predetermined threshold. Battery voltage monitor 330 may comprise a charger, a voltage monitor, one or more monitoring blocks, etc. In examples where the mobile computing device comprises an analog-to-digital converter (ADC), those voltage levels may additionally or alternatively be monitored by battery voltage monitor 330 and provided to control subsystem 332.

Control subsystem 332 comprises an embedded microcontroller 334 and a power manager 336. Power manager 336 may be an example of a system management framework (SMF). The SMF may be considered a thermal power management framework that allows advanced systemwide controls for thermal or power reasons. For example, touch temperature and/or external transfer temperatures of a device can be monitored. Based on such thermal information, control loops like a proportional-integral derivative (PID) control can be run, with the output sent to a power cap that the SMF framework can then handle. This allows for a common control framework to be applied to processors built by different manufacturers and having differing internal specifications.

Embedded microcontroller 334 receives sensed power from the different components of power consuming subsystems 304, summing with its own power to determine a total power, and a battery voltage from battery voltage monitor 330. As part of the brownout protection decision making process, embedded microcontroller 334 can determine whether the ROP power output from power sensor C 316 and power sensor D 318 is above or below a threshold, and the battery voltage relative to a set of thresholds.

Power manager 336 may monitor power and/or current, then run a PID loop and output a command to throttle one or more components. However, raw power readout can fluctuate greatly over time. As such, before the values are passed to power manager 336, averages can be taken by embedded microcontroller 334. As an example, averages may be taken as exponential weighted moving averages, where the values are averaged over a moving window having a fixed duration, or time constant ($\tau$). There may be a first average that has a shorter averaging time constant ($\tau 1$) (e.g., fast average) and a second average that has a longer averaging time constant ($\tau 2$) (e.g., slow average). Each of those averages may be provided to a separate PID loop, allowing for multiple layers of control. The fast average acts as a filter that smooths the noisy power profile from the amplifier. This allows for some filtering while still enabling rapid throttle decisions. This allows for a determination that the ROP power is consistently higher than the ROP power threshold, so the ROP components may be throttled when the user is utilizing a loud amplifier for music, or heavy wireless communications usage, preventing brownouts due to the battery voltage is throttling the SOC.

Control subsystem 332 outputs signals to power consuming subsystems 304, causing throttling to happen, whether that be SoC throttling and/or ROP throttling. The signals may indicate the throttling of those components at different levels. In some examples, those throttling levels are preconfigured. For example, audio amplifiers and/or other ROP subsystems may be hard limited momentarily. The SOC may be throttled momentarily and/or may be preemptively limited. By prioritizing brown-out control in this way, user-noticeable performance impacts may be minimized. Control subsystem 332 may be configured to throttle ROP subsystems first when their power runs higher than a pre-determined threshold. Control subsystem 332 may be further configured to dynamically adjust between SOC performance and user experience and/or between SOC performance and ROP subsystem performance, depending on the operating conditions, such as the computing activities being performed by the user.

Figure 4:
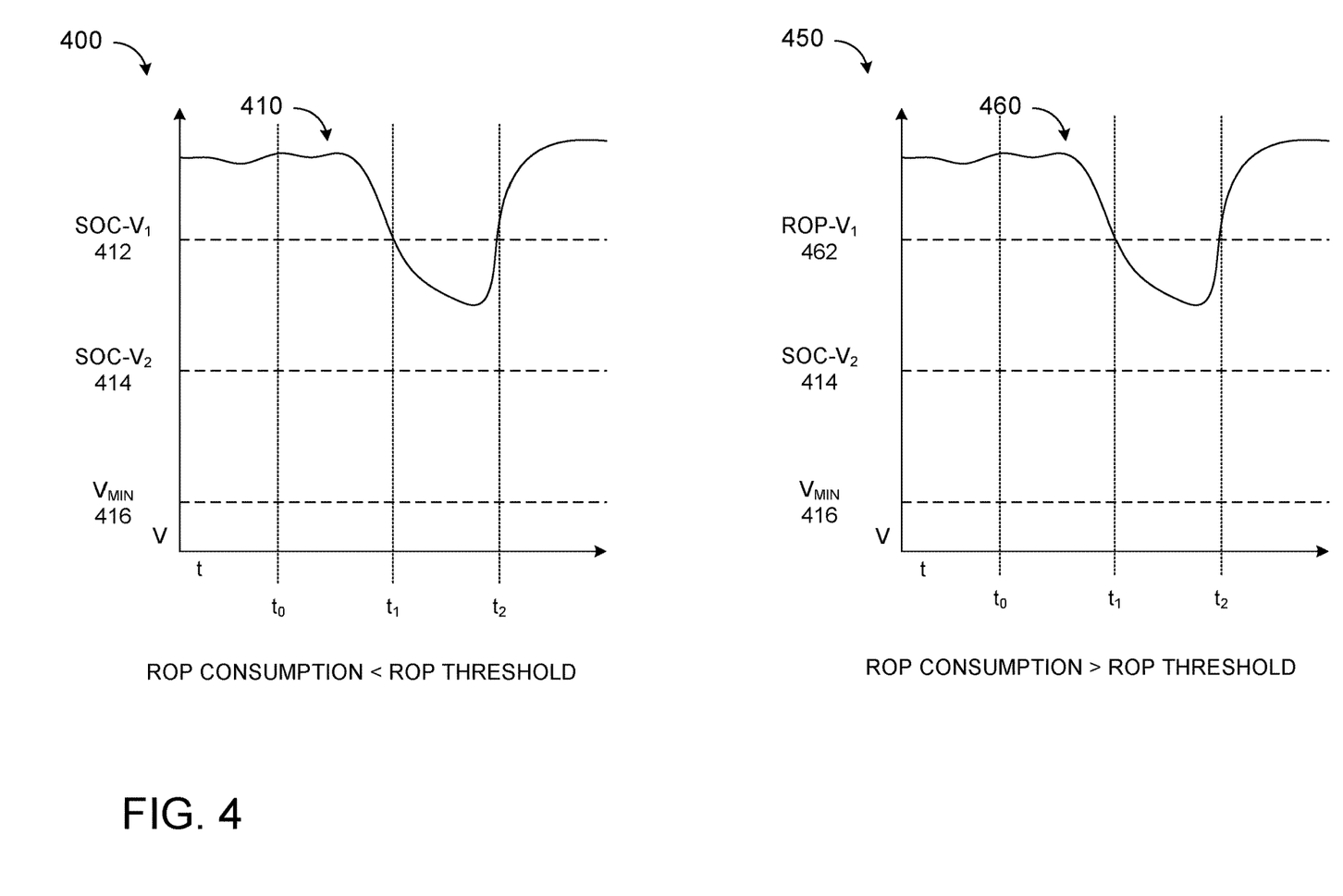
FIG. 4 shows example voltage plots with dynamic threshold configuration for prioritized brownout protection.

FIG. 4 shows a pair of example voltage plots with dynamic threshold configuration for prioritized brownout protection. Plot 400 shows battery voltage over time (e.g., the output of a battery voltage monitor, such as battery voltage monitor 330) for a scenario where the fast average ROP power consumption is less than a predetermined ROP power consumption threshold. Battery voltage fluctuates over time as indicated at 410. During the scenario where ROP power consumption<ROP power threshold, the controller sets three thresholds: A first SOC throttling threshold SOC-$V_1$ 412, A second SOC (lower voltage) throttling threshold SOC-$V_2$ 414, and a minimum battery voltage $V_{MIN}$ 416. As an example, SOC-$V_1$ 412 may be set at 6V, SOC-$V_2$ 414 may be set at 5.6V, and $V_{MIN}$ 416 may be set at 5.3 V. When battery voltage 410 drops below first SOC throttling threshold SOC-$V_1$ 412, the SOC core clock may be throttled by 30%. When battery voltage 410 drops below second SOC throttling threshold SOC-$V_2$ 414, the SOC core clock may be throttled by 50%. When battery voltage 410 drops below minimum battery voltage $V_{MIN}$ 416, the SOC core clock may be throttled by 75%. This SOC throttling may include the CPU, the SOC, or any of the component processors—NPU, GPU, etc., based on operating conditions and the component power sensed. In other examples, the CPU voltage can be cut to throttle power. CPU core power is inherently proportional to $C*V^2*F$, where F is a core logic clock switching frequency, C is the capacitance of the core power rail in the chip, and V is the core supply voltage of the processors. If the supply voltage is reduced, then power reduces by a square log factor at least.

At time $t_0$, voltage is greater than SOC-$V_1$ 412, and no throttling is applied. At time $t_1$, voltage droops below SOC-$V_1$ 412, and a first level of throttling is applied to the SOC. At time $t_2$, voltage increases above SOC-$V_1$ 412, and throttling is lifted from the SOC.

Plot 450 shows battery voltage over time for a scenario where the fast average ROP power consumption is greater than the ROP power consumption threshold. In this case, the ROP is throttled first, before the SOC, when the total power crosses a threshold in order to maintain SOC performance. Voltage fluctuates over time as indicated at 460. While ROP power consumption>ROP power threshold, the controller may replace or augment SOC-$V_1$ 412 with ROP throttling threshold ROP-$V_1$ 462, while maintaining SOC-$V_2$ 414, and $V_{MIN}$ 416. In this example, ROP-$V_1$ 462 may be set at 6V. However, ROP-$V_1$ 462 may be set higher, e.g., 6.5 V, so that SOC-$V_1$ 412 may be maintained at 6V or another level that maintains distance from ROP-$V_1$ 462 so as to prevent unnecessary throttling of the SOC. In this way, if voltage levels droop even further below ROP-$V_1$ 462, some throttling of the CPU or the other SOC processors may occur in addition to the ROP.

At time $t_0$, battery voltage is greater than ROP-$V_1$ 462, and no throttling is applied. At time $t_1$, battery voltage droops below ROP-$V_1$ 462, and a first level of throttling is applied to the ROP. Applying throttling to the ROP may depend on which ROP subsystems are being operated and at what power levels. For example, a signal may be sent to one or more audio amplifier(s) to kill gain adjustment for a duration, e.g., 10 mSec, 50 mSec, 100 mSec. A signal may be sent to one or more tweeters and/or woofers to kill gain adjustment for a duration, e.g., 10 mSec, 50 mSec, 100 mSec. A signal may be sent to one or more haptic peak current gain adjusters to lower the acceleration of the haptic motors. A signal may be sent to a 5G amplifier to adjust gain to be in a lower range, lower data rate, trade-off with lower through-put, etc. At time $t_2$, battery voltage increases above ROP-$V_1$ 412, and throttling is lifted from the ROP.

Figure 5:
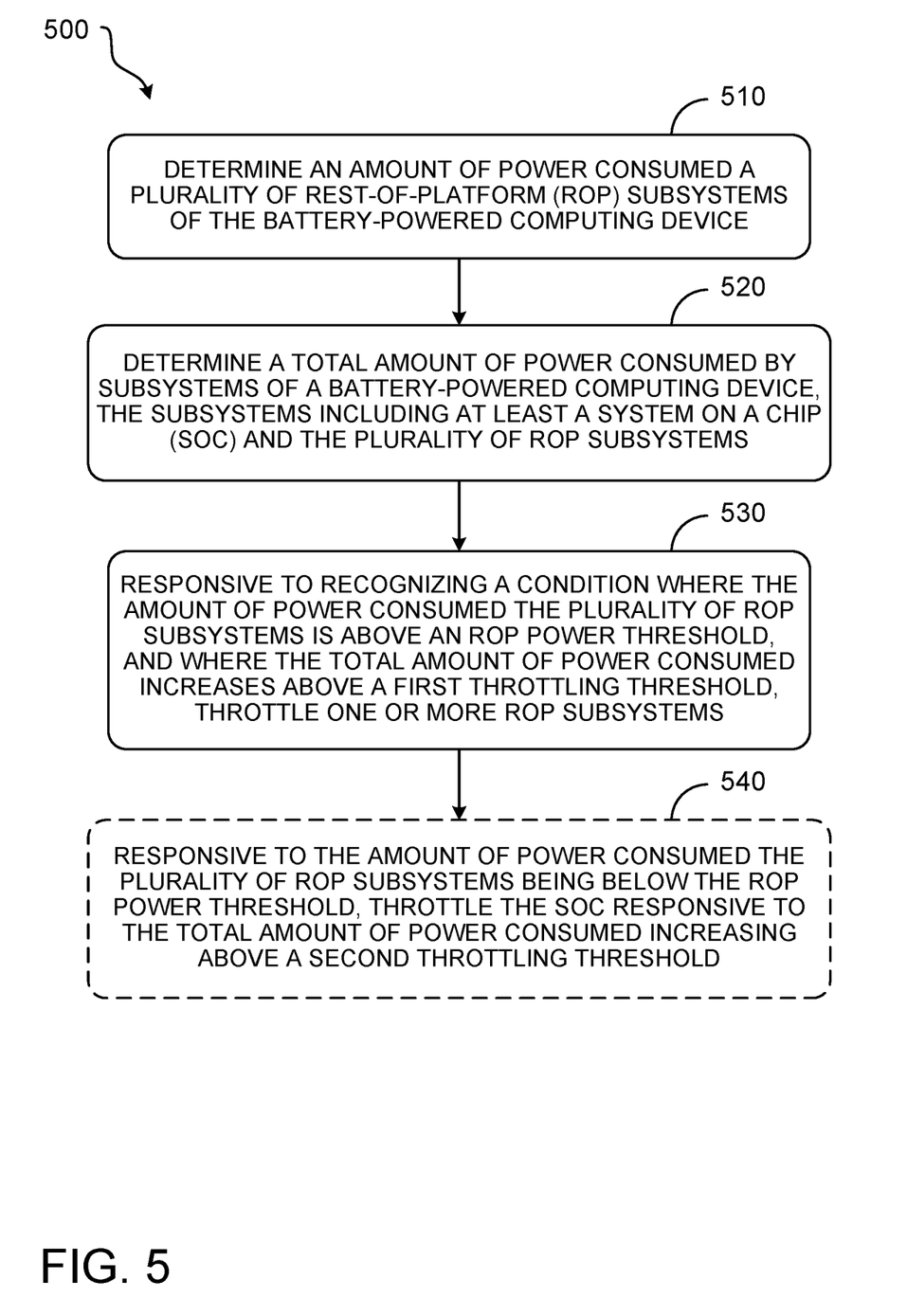
FIG. 5 is an example method for selectively throttling subsystems of a battery-powered computing device.

FIG. 5 is a flow-diagram for an example method 500 for selectively throttling subsystems of a battery-powered computing device. Method 500 may be enacted via a control subsystem of a battery-powered computing device, such as control subsystem 332 of battery monitor and protection subsystem 302, as shown in FIG. 3. While described primarily with reference to system architecture 300, method 500 may be performed by any appropriate power management subsystem of a battery-powered computing device.

At 510, method 500 includes determining an amount of power consumed by a plurality of ROP subsystems of the battery-powered computing device. For example, ROP subsystems may be monitored for power consumption by one or more power sensors. The power sensors may then report the ROP power levels to a control subsystem. In the example of FIG. 3, ROP left 324 is monitored by power sensor C 316, and ROP right 326 is monitored by power sensor D 318. Both power sensor C 316 and power sensor D 318 report sensed power levels to embedded microcontroller 334 within control subsystem 332. In some examples, a single power sensor is used to monitor all ROP power consumption. In other examples, different power sensors may be assigned to different ROP subsystems, providing a more granular readout.

At 520, method 500 includes determining a total amount of power consumed by subsystems of a battery-powered computing device, the subsystems including at least a system on a chip (SOC) and the plurality of ROP subsystems. For example, the SOC and any other processors may be monitored for power consumption by one or more power sensors. The power sensors may then report the SOC power levels to the control subsystem. In the example of FIG. 3, SOC A 320 is monitored by power sensor A 312, and SOC B 322 is monitored by power sensor B 314. Both power sensor A 312 and power sensor B 314 report sensed power levels to embedded microcontroller 334 within control subsystem 332. In some examples, a single power sensor is used to monitor all SOC power consumption. In other examples, different power sensors may be assigned to different processors, providing a more granular readout. The SOC power consumption and ROP subsystem power consumption may then be summed, e.g., at the embedded microcontroller.

At 530, method 500 includes, responsive to a condition where the amount of power consumed the plurality of ROP subsystems is above an ROP power threshold, and where the total amount of power consumed increases above a first throttling threshold, throttling one or more ROP subsystems. The ROP power threshold and the first throttling threshold may be predetermined and/or based on operating conditions. Effectively, when the ROP power consumed is above the ROP power threshold, and the total amount of power is above the first throttling threshold, the ROP subsystems are throttled, but not the SOC. This allows for SOC performance to be maintained while reducing the likelihood of brownout conditions. The ROP subsystems to be throttled may be based on operating conditions, e.g., killing gain to an audio amplifier or speaker that is being actively used, reducing gain to a 5G amplifier, reducing acceleration of haptic motors, etc.

Optionally, at 540, method 500 includes, responsive to the amount of power consumed the plurality of ROP subsystems being below the ROP power threshold, throttling the SOC responsive to the total amount of power consumed increasing above a second throttling threshold. The second throttling threshold may be predetermined and/or based on operating conditions. When the ROP power consumed is below the ROP power threshold, and the total amount of power is above the second throttling threshold, the SOC is throttled, but not the ROP subsystems. In this way, the primary power consumptive subsystem is throttled, but the ROP subsystems are maintained, allowing for improved user experiences. Throttling the SOC may be performed across-the-board, and/or may be performed per-processor based on operating conditions.

In some examples, the first throttling threshold and the second throttling threshold comprise equivalent amounts of power consumed. As such, whether the ROP subsystem power consumption is above or below the ROP power threshold, the initial throttling threshold remains the same. Whether the SOC or ROP is throttled upon crossing this initial throttling threshold is determined by the ROP subsystem power consumption relative to the ROP power threshold. In some examples, the first throttling threshold comprises a higher amount of total power consumed than the second throttling threshold. As described with regard to FIG. 4, setting different throttling thresholds may prevent unnecessary throttling of the SOC.

In some examples, the SOC is further throttled responsive to total power consumed increasing above a third throttling threshold, the third throttling threshold greater than the second throttling threshold. In other words, as total power consumed continues to increase, and battery voltage continues to droop, more aggressive throttling of the SOC may be desirable.

In some examples, the SOC is throttled responsive to total power consumed increasing above a third throttling threshold, the third throttling threshold greater than the first throttling threshold. As such, conditions where total power consumed is high, and where ROP power consumed it high, both the ROP subsystems and the SOC may be throttled.

In some examples, throttling one or more ROP subsystems responsive to the total amount of power consumed being below the first throttling threshold, and the amount of power consumed by the plurality of ROP subsystems being greater than a threshold percentage of the total amount of power consumed. In other words, if the ROP subsystems are consuming a significant amount of power, they may be throttled pre-emptively to prevent having to throttle the SOC.

In some examples, the total power consumed by subsystems of the battery-powered computing device and the amount of power consumed by the plurality of ROP subsystems are determined over moving windows of time. This may allow for total power to be averaged over a short duration. For certain subsystems, such as audio amplifiers and haptic motors, the power consumed over time may fluctuate significantly. By averaging the power consumed over time, a more accurate picture of power consumption may be obtained, and throttling based on individual spikes in power consumption may be avoided.

Figure 6:
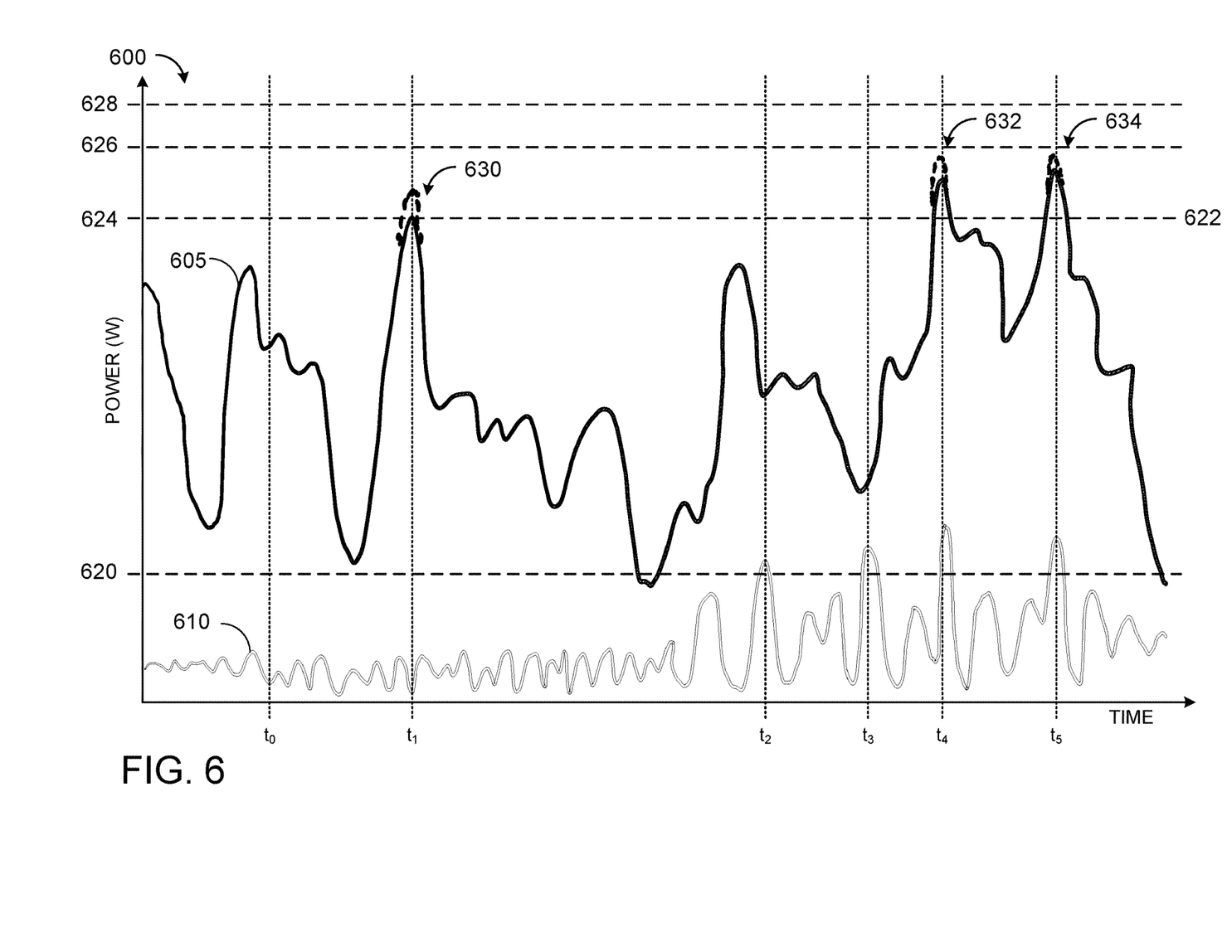
FIG. 6 is a timing plot indicating total system power and rest-of-platform power consumed over time for selective throttling based on the method of FIG. 5.

FIG. 6 shows an illustrative plot 600 indicating total power consumption (line 605) and ROP power consumption (line 610) over time. Plot 600 includes threshold 620, indicating an ROP power threshold, and threshold 622, indicating a first (ROP) throttling threshold (e.g., an amount of power corresponding to the voltage of threshold ROP-$V_1$ 462 of FIG. 4). Plot 600 further includes threshold 624, indicating a second (SOC) throttling threshold (e.g., an amount of power corresponding to the voltage of threshold SOC-$V_1$ 412 of FIG. 4), threshold 626, indicating a third (SOC) throttling threshold (e.g., an amount of power corresponding to the voltage of threshold SOC-$V_2$ 414 of FIG. 4), and threshold 628, indicating a threshold for $P_{MAX}$ (e.g., power level corresponding to of $V_{MIN}$ 416 of FIG. 4). For simplicity, thresholds 622 and 624 are set equal, representing a brownout threshold margin of <30%. Threshold 626 represents a brownout threshold margin of <20%, and threshold 628 represents a brownout threshold margin of <10%.

At time $t_0$, ROP power consumed (610) is below threshold 620. As such, threshold 622 is inactive. At time $t_1$, average total power (605) increases above threshold 624. The brownout risk is thus mitigated by throttling the SOC, e.g., by dropping the CPU core voltage momentarily or by momentarily dropping the clocking frequency by 20%. This prevents further voltage droop that would otherwise have occurred with increased power consumption, as indicated at 630.

At time $t_2$ and time $t_3$, spikes in ROP power consumed increase above threshold 620, As such, threshold 624 is activated. At time $t_4$, and time $t_5$, average total power (605) increases above threshold 624. The brownout risk is thus mitigated by throttling the ROP, such as by dropping audio gain 50% momentarily. In this way, further voltage droop that would otherwise have occurred with increased power consumption is prevented, as indicated at 632 and 634, respectively.

Figure 7:
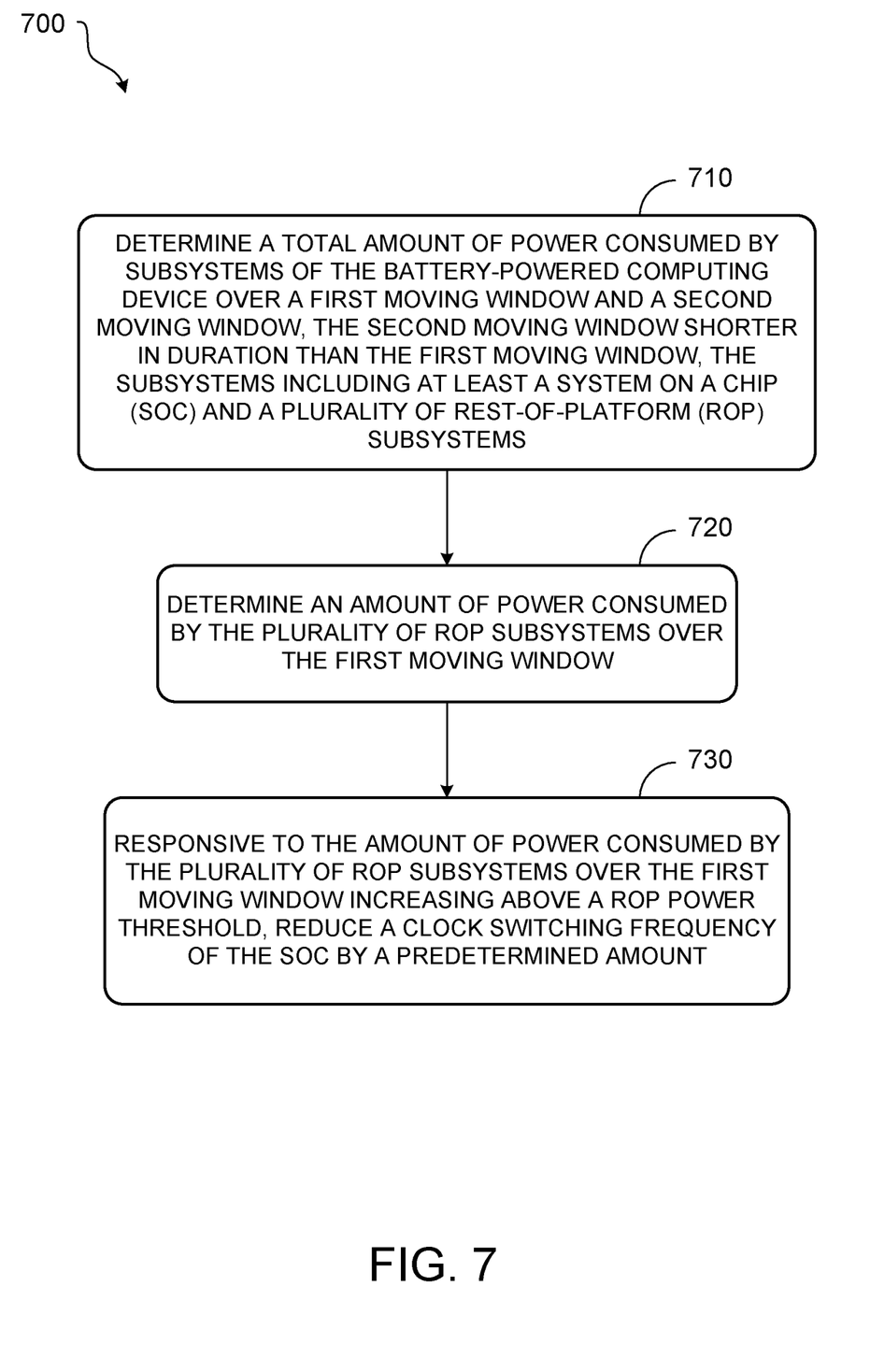
FIG. 7 is an example method for selectively throttling peak SOC power.

In some examples, it may be beneficial to throttle SOC power through a reduction in peak clock switching frequencies in order to reduce the likelihood of reaching brownout thresholds where significant voltage reduction is triggered. In other words, peak clock switching frequencies may be reduced prior to total power consumption levels increase above throttling thresholds as shown in FIG. 6. FIG. 7 is a flow diagram for an example method 700 for selectively throttling subsystems of a battery-powered computing device, such as by pre-emptively throttling SOC power. As described with regard to method 500, method 700 may be enacted via a control subsystem of a battery-powered computing device, such as control subsystem 332 of battery monitor and protection subsystem 302, as shown in FIG. 3, and/or by any appropriate power management subsystem of a battery-powered computing device.

At 710, method 700 includes determining a total amount of power consumed by subsystems of the battery-powered computing device over a first moving window and a second moving window the second moving window shorter in duration (e.g. shorter time constant) than the first moving window (e.g. longer time constant), the subsystems including at least a system on a chip (SOC) and a plurality of ROP subsystems. For examples, the SOC and the ROP subsystems may be monitored for power consumption by one or more power sensors. In the example of FIG. 3, ROP left 324 is monitored by power sensor C 316, and ROP right 326 is monitored by power sensor D 318, SOC A 320 is monitored by power sensor A 312, and SOC B 322 is monitored by power sensor B 314. Each power sensor may then report sensed power levels to embedded microcontroller 334 within control subsystem 332. However, as described herein the total number of power sensors assigned to the ROP subsystems and the SOC may be greater or fewer than two.

At 720, method 700 includes determining an amount of power consumed by the plurality of ROP subsystems over the first moving window. For example, the total power consumed by the plurality of ROP subsystems may be averaged, moving averaged, integrated, or otherwise determined for a duration of the first moving window with a pre-determined granularity.

At 730, method 700 includes, responsive to the amount of power consumed by the plurality of ROP subsystems over the first moving window increasing above a ROP power threshold, reducing a clock switching frequency of the SOC by a predetermined amount. For example, the CPU core clocking frequency may be immediately dropped by 20%, or any amount suitable for operating conditions. This prevents further voltage droop that would otherwise have occurred with increased power consumption.

In some examples, the ROP power threshold is based on the total power consumed by subsystems of the battery-powered computing device over the second moving window. In some examples, the threshold is independent of the total power consumed by subsystems of the battery-powered computing device. In some examples, responsive to the total amount of power consumed increasing above a throttling threshold, the SOC may be throttled.

If the SOC switching frequency is maintained at a maximum switching frequency (e.g., 3 GHz), then, if SOC peak power increases, the chance of reaching brownout thresholds also increases. By employing method 700, as the ROP power increases, preemptively throttling the SOC switching frequency may mitigate some of the risk of reaching brownout thresholds where more intense throttling is needed.

As an example, if the user is utilizing a loud amplifier for music, or heavy wireless communications usage, the SOC performance may be reduced (e.g., 90%) but kept at a relatively high level in order to pre-empt brownout conditions. If the fast average of total power crosses the prescribed thresholds, the power may then be throttled accordingly, as described with regard to FIGS. 5 and 6.

By using a slow average of the ROP power, a clear indication may be provided that the ROP power is continuously elevated. This is preferable to using the fast average which undergoes more fluctuation. Indeed, using the fast average pre-emptively may generate unnecessary throttling and un-throttling of the SOC. Using the slow average allows for observations over longer time periods that may indicate trends, allowing for pre-emptive mitigation with modest reductions in performance.

Combining or otherwise executing both method 500 and method 700 allows for throttling SOC voltage or power as a last resort. The brownout throttles of the ROP side may occur over a very short time, e.g., 10 ms. Throttling an audio amplifier may result in a brief hiccup in volume, or distortion, or audio compression. But at that time scale, the user may not notice the interruption. That allows the SOC performance going to be maintained. If the user is gaming, and pushing the amplifier, and the SOC is throttled, it will impact the FPS of the display, creating a lag that's visually noticeable to the user. But a brief blip in sound may go unnoticed. This is similar to the case of wireless communications amplification. If a 5G amplifier is throttled for 10 or 20 ms, there may be a mild dip in throughput or a short disconnection. The data rate may even drop significantly. But over the millisecond duration, it is unlikely to impact the overall throughput very much, and the user may not notice.

Figure 8:
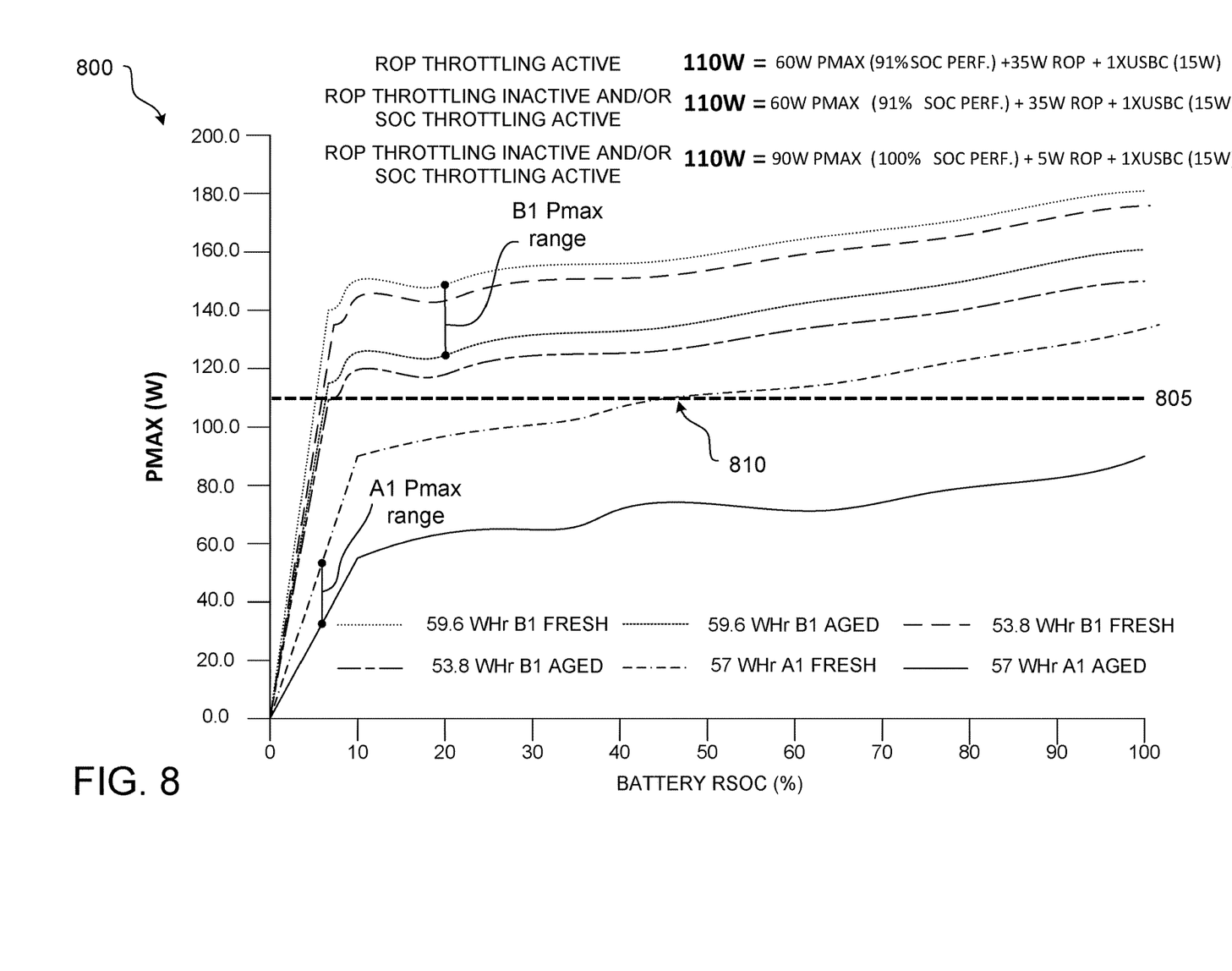
FIG. 8 shows an example plot illustrating battery peak power capability using brown out control trade-off.

FIG. 8 shows an example plot 800 illustrating battery peak power capability using brown out control trade-off. A throttling threshold of 110 W is shown at 805. In some examples, this threshold may be an equivalent power level to an ROP throttling threshold, in other examples, this threshold is an equivalent power level to an SOC throttling threshold.

When configured as an SOC throttling threshold, throttling is performed by throttling the SOC clock Fsw so aggressively that SOC power can be limited to around 20 W momentarily. This causes significant noticeable time lagging to the user experience, such as stalled processing or reduced FPS.

Alternatively when configured as an ROP throttling threshold, SOC power may be pre-emptively throttled (e.g., Fsw reduced from 3 GHz to 2.7 GHz) when the slow average of ROP power is higher than a threshold level of power. When total power consumption crosses a power level of an ROP throttling threshold, 35 W ROP might be limited to around 10 W ROP momentarily. This may merely result in slight audio sound distortion momentarily.

As shown at 810, at 50% relative state of charge (RSOC) of a fresh A1 battery, SOC performance delta projection is <10% while allowing 35 W ROP (vs. 5 W ROP). When the ROP load surges, by reactively and momentarily reducing peak power of ROP subsystems from 35 W tp 5 W (e.g., mSec range), the user experience may be minimally impacted (e.g., audio with short blips of sound distortion). At least, the user experience is not impacted as noticeably with SOC throttling (e.g., SOC CPU performance degradation by ~30 Watt momentarily when CPU is throttled reactively).

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
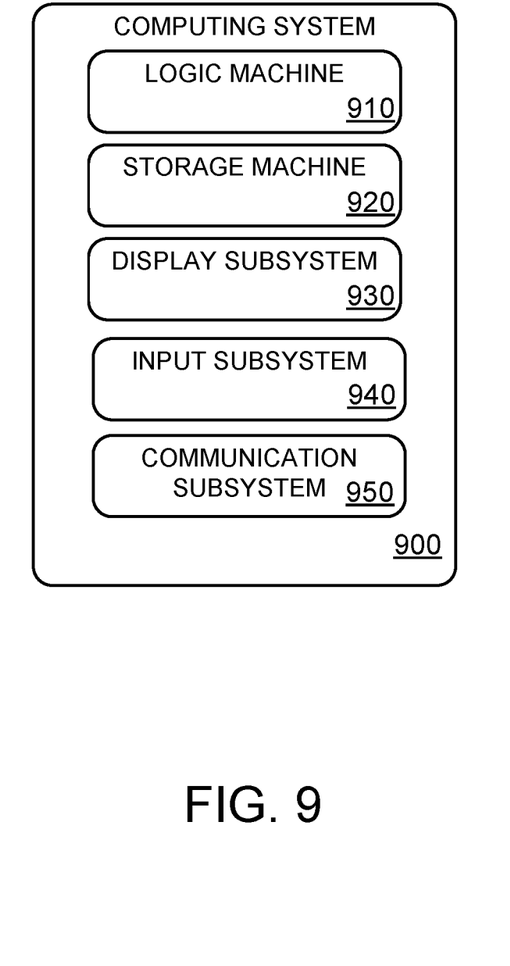
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, input subsystem 940, communication subsystem 950, and/or other components not shown in FIG. 9. Laptop computing device 102 is an example of computing system 900. CPU 104, GPU 106, CPU & NPU 210, GPU 212, SOC A 320, SOC B 322, and embedded microcontroller 334 are examples of logic machine 910. Memory 212 is an example of storage machine 920. Gaming controller 116 is an example of input subsystem 940. Wireless communication amplifiers 112 may be an example of a component of communication subsystem 950.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 910 executing instructions held by storage machine 920. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, input subsystem 940 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 950 may be configured to communicatively couple computing system 900 with one or more other computing devices. Communication subsystem 950 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In one example, a method for selectively throttling subsystems of a battery-powered computing device is presented. The method comprises determining an amount of power consumed by a plurality of rest-of-platform (ROP) subsystems of the battery-powered computing device; determining a total amount of power consumed by subsystems of the battery-powered computing device, the subsystems including at least a system on a chip (SOC) and the plurality of ROP subsystems; and responsive to recognizing a condition where the amount of power consumed the plurality of ROP subsystems is above an ROP power threshold, and where the total amount of power consumed increases above a first throttling threshold, throttling one or more ROP subsystems. The technical effect of implementing this method is an improved user experience by maintaining processor performance. In such an example, or any other example, the method additionally or alternatively comprises, responsive to the amount of power consumed the plurality of ROP subsystems being below the ROP power threshold, throttling the SOC responsive to the total amount of power consumed increasing above a second throttling threshold. In any of the preceding examples, or any other example, the first throttling threshold and the second throttling threshold additionally or alternatively comprise equivalent amounts of power consumed. In any of the preceding examples, or any other example, the first throttling threshold additionally or alternatively comprises a higher amount of total power consumed than the second throttling threshold. In any of the preceding examples, or any other example, the SOC is additionally or alternatively throttled responsive to total power consumed increasing above a third throttling threshold, the third throttling threshold greater than the second throttling threshold. In any of the preceding examples, or any other example, the SOC is additionally or alternatively throttled responsive to total power consumed increasing above a third throttling threshold, the third throttling threshold additionally or alternatively being greater than the first throttling threshold. In any of the preceding examples, or any other example, the method additionally or alternatively comprises throttling one or more ROP subsystems responsive to the total amount of power consumed being below the first throttling threshold, and the amount of power consumed by the plurality of ROP subsystems being greater than a threshold percentage of the total amount of power consumed. In any of the preceding examples, or any other example, the total power consumed by subsystems of the battery-powered computing device and the amount of power consumed by the plurality of ROP subsystems are additionally or alternatively determined over moving windows of time.

In another example, a method for selectively throttling subsystems of a battery-powered computing device is presented. The method comprises determining a total amount of power consumed by subsystems of the battery-powered computing device over a first moving window and a second moving window, the second moving window shorter in duration than the first moving window, the subsystems including at least a system on a chip (SOC) and a plurality of rest-of-platform (ROP) subsystems; determining an amount of power consumed by the plurality of ROP subsystems over the first moving window; and responsive to the amount of power consumed by the plurality of ROP subsystems over the first moving window increasing above a ROP power threshold, reducing a clock switching frequency of the SOC by a predetermined amount. The technical effect of implementing such a method is an increased reliability of the processors through pre-emptive brownout prevention. In such an example, or any other example, the ROP power threshold is additionally or alternatively based on the total amount of power consumed by subsystems of the battery-powered computing device over the second moving window. In any of the preceding examples, or any other example, the ROP power threshold is additionally or alternatively independent of the total power consumed by subsystems of the battery-powered computing device. In any of the preceding examples, or any other example, the method additionally or alternatively comprises throttling the SOC responsive to the total amount of power consumed increasing above a throttling threshold.

In yet another example, a system for a battery-powered computing device is presented. The system comprises a system on a chip (SOC) comprising one or more processors; a plurality of rest-of-platform (ROP) subsystems; a battery monitor and protection system, comprising: a battery configured to supply power to the SOC and the ROP subsystems; a battery voltage monitor; and a control subsystem configured to determine a total amount of power consumed by subsystems of the battery-powered computing device over a first moving window and a second moving window, the second moving window shorter in duration than the first moving window, the subsystems including at least the SOC and the plurality of the ROP subsystems; determine an amount of power consumed by the plurality of ROP subsystems over the first moving window; and responsive to the amount of power consumed by the plurality of ROP subsystems over the first moving window increasing above a ROP power threshold, reduce a clock switching frequency of the SOC by a predetermined amount. The technical effect of implementing this system is an enhanced reliability of the computing device through reduced occurrences of brownout conditions. In such an example, or any other example, the ROP power threshold is additionally or alternatively based on the total amount of power consumed by subsystems of the battery-powered computing device over the second moving window. In any of the preceding examples, or any other example, the plurality of ROP subsystems additionally or alternatively include at least a left audio amplifier and a right audio amplifier. In any of the preceding examples, or any other example, the plurality of ROP subsystems additionally or alternatively include at least a wireless communication subsystem amplifier. In any of the preceding examples, or any other example, the control subsystem is additionally or alternatively configured to determine an amount of power consumed the plurality of ROP subsystems; determine a total amount of power consumed by subsystems of the battery-powered computing device, the subsystems including at least the SOC and the plurality of ROP subsystems; and responsive to a condition where the amount of power consumed by the plurality of ROP subsystems is above an ROP power threshold, and where the total amount of power consumed increases above a first throttling threshold, throttle one or more of the plurality of ROP subsystems. In any of the preceding examples, or any other example, the control subsystem is additionally or alternatively configured to, responsive to the amount of power consumed the plurality of ROP subsystems being below the ROP power threshold, throttle the SOC responsive to the total amount of power consumed increasing above a second throttling threshold. In any of the preceding examples, or any other example, the control subsystem is additionally or alternatively configured to further throttle the SOC responsive to total power consumed increasing above a third throttling threshold, the third throttling threshold greater than the second throttling threshold. In any of the preceding examples, or any other example, the control subsystem is additionally or alternatively configured to throttle one or more of the plurality of ROP subsystems responsive to the total amount of power consumed being below the first throttling threshold, and the amount of power consumed by the plurality of ROP subsystems being greater than a threshold percentage of the total amount of power consumed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for selectively throttling subsystems of a battery-powered computing device, comprising:
   determining an amount of power consumed by a plurality of rest-of-platform (ROP) subsystems of the battery-powered computing device;
   determining a total amount of power consumed by subsystems of the battery-powered computing device, the subsystems including at least a system on a chip (SOC) and the plurality of ROP subsystems;
   responsive to recognizing a condition where the amount of power consumed by the plurality of ROP subsystems is above an ROP power threshold, and where the total amount of power consumed increases above a first throttling threshold, throttling one or more ROP subsystems; and
   responsive to the amount of power consumed by the plurality of ROP subsystems being below the ROP power threshold, throttling the SOC responsive to the total amount of power consumed increasing above a second throttling threshold.

2. The method of claim 1, wherein the first throttling threshold and the second throttling threshold comprise equivalent amounts of power consumed.

3. The method of claim 1, wherein, the first throttling threshold comprises a higher amount of total power consumed than the second throttling threshold.

4. The method of claim 1, wherein the SOC is further throttled responsive to total power consumed increasing above a third throttling threshold, the third throttling threshold greater than the second throttling threshold.

5. The method of claim 1, wherein the SOC is throttled responsive to total power consumed increasing above a third throttling threshold, the third throttling threshold greater than the first throttling threshold.

6. The method of claim 1, further comprising throttling one or more ROP subsystems responsive to the total amount of power consumed being below the first throttling threshold, and the amount of power consumed by the plurality of ROP subsystems being greater than a threshold percentage of the total amount of power consumed.

7. The method of claim 1, wherein the total power consumed by subsystems of the battery-powered computing device and the amount of power consumed by the plurality of ROP subsystems are determined over moving windows of time.

8. A method for selectively throttling subsystems of a battery-powered computing device, comprising:
   determining a total amount of power consumed by subsystems of the battery-powered computing device over a first moving window, the subsystems including at least a system on a chip (SOC) and a plurality of rest-of-platform (ROP) subsystems;
   determining an amount of power consumed by the plurality of ROP subsystems over the first moving window; and
   responsive to the amount of power consumed by the plurality of ROP subsystems over the first moving window increasing above a ROP power threshold, reducing a clock switching frequency of the SOC by a predetermined amount, wherein the ROP power threshold is based on the total amount of power consumed by subsystems of the battery-powered computing device over a second moving window, the second moving window shorter in duration than the first moving window.

9. The method of claim 8, wherein the ROP power threshold is independent of the total power consumed by subsystems of the battery-powered computing device.

10. The method of claim 8, further comprising:
    throttling the SOC responsive to the total amount of power consumed increasing above a throttling threshold.

11. A system for a battery-powered computing device; comprising:
    a system on a chip (SOC) comprising one or more processors;
    a plurality of rest-of-platform (ROP) subsystems;
    a battery monitor and protection system, comprising:
      a battery configured to supply power to the SOC and the ROP subsystems;
      a battery voltage monitor; and
      a control subsystem configured to:
        determine a total amount of power consumed by subsystems of the battery-powered computing device over a first moving window, the subsystems including at least the SOC and the plurality of the ROP subsystems;
        determine an amount of power consumed by the plurality of ROP subsystems over the first moving window; and
        responsive to the amount of power consumed by the plurality of ROP subsystems over the first moving window increasing above a ROP power threshold, reduce a clock switching frequency of the SOC by a predetermined amount, wherein the ROP power threshold is based on the total amount of power consumed by subsystems of the battery-powered computing device over a second moving window, the second moving window shorter in duration than the first moving window.

12. The system of claim 11, wherein the plurality of ROP subsystems include at least a left audio amplifier and a right audio amplifier.

13. The system of claim 11, wherein the plurality of ROP subsystems include at least a wireless communication subsystem amplifier.

14. The system of claim 11, wherein the control subsystem is further configured to:
responsive to a condition where the amount of power consumed by the plurality of ROP subsystems is above the ROP power threshold, and where the total amount of power consumed increases above a first throttling threshold, throttle one or more of the plurality of ROP subsystems.

15. The system of claim 14, wherein the control subsystem is further configured to:
responsive to the amount of power consumed by the plurality of ROP subsystems being below the ROP power threshold, throttle the SOC responsive to the total amount of power consumed increasing above a second throttling threshold.

16. The system of claim 15, wherein the control subsystem is further configured to:
further throttle the SOC responsive to total power consumed increasing above a third throttling threshold, the third throttling threshold greater than the second throttling threshold.

17. The system of claim 14, wherein the control subsystem is further configured to:
throttle one or more of the plurality of ROP subsystems responsive to the total amount of power consumed being below the first throttling threshold, and the amount of power consumed by the plurality of ROP subsystems being greater than a threshold percentage of the total amount of power consumed.

* * * * *